Aug. 13, 1940.   F. W. DUNMORE   2,210,903
TEMPERATURE MEASURING
Filed Dec. 22, 1938   2 Sheets-Sheet 1
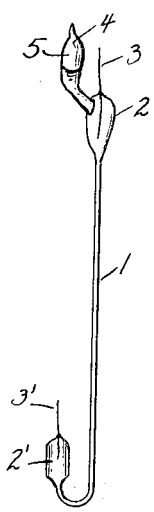
Fig. 1.
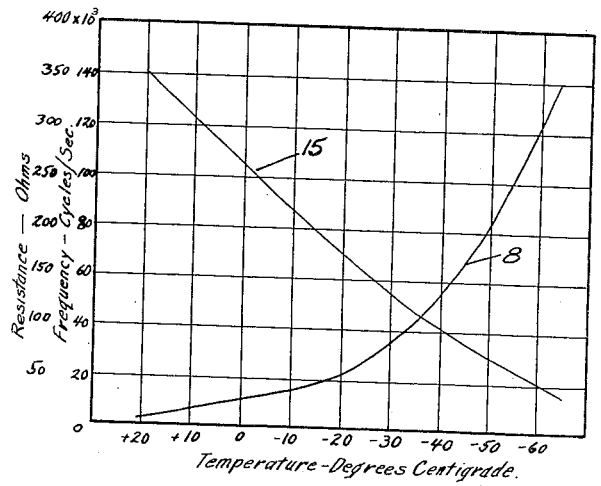
Fig. 4.
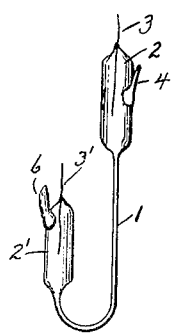
Fig. 2.
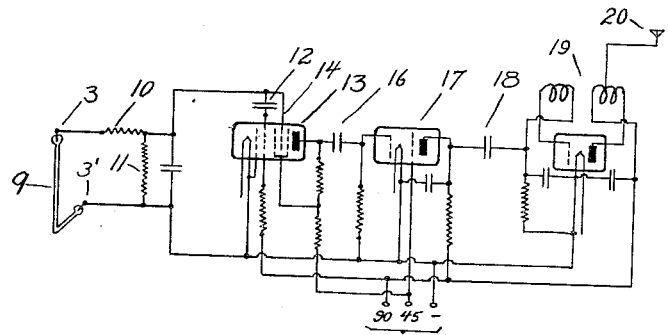
Fig. 5.
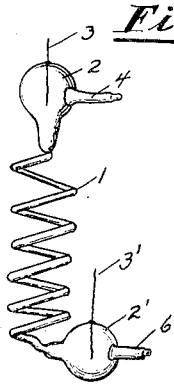
Fig. 3.
Fig. 6.
Francis W. Dunmore,
INVENTOR
BY
ATTORNEY

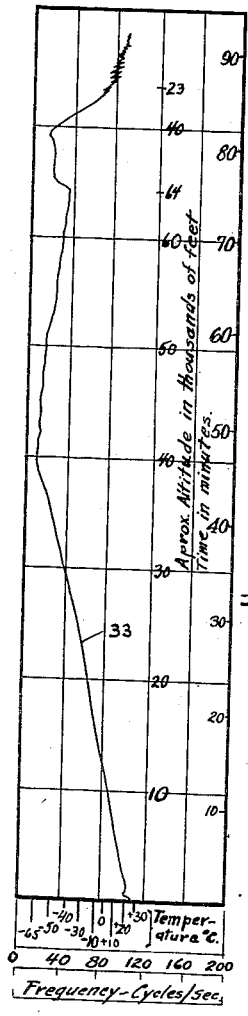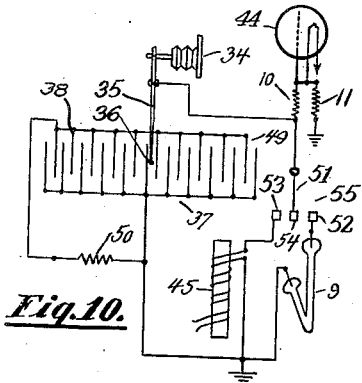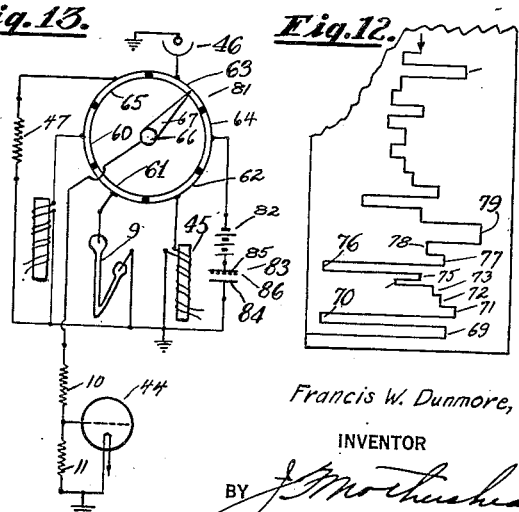

Patented Aug. 13, 1940

2,210,903

UNITED STATES PATENT OFFICE 2,210,903

TEMPERATURE MEASURING

Francis W. Dunmore, Washington, D. C., assignor to the Government of the United States as represented by the Secretary of Commerce Application December 22, 1938, Serial No. 247,242

6 Claims. (Cl. 177—380)

(Granted under the act of March 3, 1883, as amended April 30, 1928; 370 O. G. 757)

The invention described herein may be made and used by or for the Government of the United States without the payment of any royalty thereon or therefor.

This invention relates to the use of radio for sending signals which are a function of the temperature at a remote point. One application of my invention is in the radio meteorograph whereby temperatures of the upper air may be more quickly and accurately obtained than previously.

Heretofore it has been necessary to use mechanically operated temperature indicating devices such as a bimetal strip which through some form of mechanical linkage actuated the radio meteorograph transmitter. Where it is necessary to register the temperature of air at increments of height, in the fraction of a second in which the balloon may be at each height (as it rises rapidly at 500 to 1000 feet per minute), mechanically operated devices such as mentioned above are too sluggish. Furthermore they require mechanical linkages in order to transform their movement (due to temperature change) into measurable variations of the radio signal.

The object of my invention is therefore to furnish accurate information at ground points of the temperature of the upper air as a function of height, using any desired rate of ascent.

Briefly, the novel method of giving this information consists of a free balloon carrying a small battery operated ultra high radio frequency transmitter with a special form of audio-frequency modulator, the frequency of which is a function of the resistance in its grid circuit. This resistance is made up of a thin column of electrolyte in a glass capillary tube. The resistance of this thin column of electrolyte is a function of its temperature so that the modulation frequency impressed on the ultra high radio frequency carriers may be interpreted in terms of temperature. An ultra high radio frequency receiver is used on the ground with a graphical frequency recorder calibrated in degrees Centigrade. Height is determined from the known rate of ascent of the balloon or by switching in alternately with the capillary tube electrolytic thermometer any one of the present type of radio meteorograph altitude indicators, such as the pressure operated commutator, the Olland clock device, etc.

While my invention is particularly adapted to the radio meteorograph it may be used to transmit temperature between two mobile units, or between two ground stations either by radio or by wire.

Other and further objects of my invention will be apparent from the following detailed description and accompanying drawings. It is to be expressly understood, however, that these drawings are for the purposes of illustration only and not designed for a definition of the limits of my invention. Referring to the illustrations:

Fig. 1 shows a type of capillary electrolytic thermometer tube according to this invention and having small terminal bulbs.

Fig. 2 shows another type of capillary electrolytic temperature tube which is U-shaped.

Fig. 3 shows one form of capillary electrolytic temperature tube in which the capillary section is coiled up.

Fig. 4 shows the resistance-temperature and frequency-temperature characteristic of a capillary electrolytic thermometer.

Fig. 5 shows the capillary temperature tube associated with a radio meteorograph transmitter circuit.

Fig. 6 shows the receiving and graphical recording apparatus used at the ground station.

Fig. 7 shows a flight graph produced by the capillary tube and circuit arrangement shown in Fig. 4.

Fig. 8 shows an arrangement for using the capillary tube in conjunction with dual-coil glass hygrometers, light cell and reference resistor used in conjunction with a pressure switch for giving altitude.

Fig. 9 shows a combination in which the temperature capillary tube is used with a dual coil glass hygrometer in conjunction with a pressure switch.

Fig. 10 shows another capillary tube coil hygrometer pressure switch arrangement with auxiliary switching means.

Fig. 11 shows the capillary electrolytic thermometer associated with a six-segment commutator, pressure switch and radio-meteorograph transmitter for recording temperature-humidity and light intensity.

Fig. 12 shows a type of graphical record produced at the receiving station by the arrangement shown in Fig. 11.

Fig. 13 shows the capillary electrolytic thermometer associated with a six-segment commutator without pressure switch but with ionic altimeter.

Referring to the drawings more in detail. Fig. 1 shows one type of construction of the capillary electrolytic thermometer. The capillary portion of this unit is shown at 1. This tubing is filled with an electrolyte which has a high temperature coefficient of resistance and which will not freeze at temperatures to which it is to be subjected in use. For normal temperatures, i. e., +25° C. to −25° C., a solution of NaOH (40 grams NaOH to 1 liter of water) may be used. For lower temperatures down to −70° C. a solution of sulphuric acid (1.30 specific gravity) may be used. Other electrolytes listed in published tables as having high temperature coefficients of resistance and low frequency points may also be used. It is preferable to choose an electrolyte which gives the smallest polarization voltages. The length, diameter and choice of electrolyte all affect the overall resistance of the capillary column of electrolyte so that the proper resistance variation for use in a given circuit may be chosen. One form of capillary consists of tubing 10 cm. long with a capillary tube diameter of 0.5 mm. with a wall thickness of 0.5 to 1.0 mm.

The ends of the capillary tube terminate in enlarged sections 2 and 2' which contain the electrode terminals 3 and 3'. These terminals may be of platinum, tungsten or any suitable material which may be sealed in glass and not acted upon by the electrolyte. An expansion chamber 5 may be provided to relieve the pressure which may be produced by any gases which may form due to electrolysis. After filling all but chamber 5 with the proper electrolyte the tube is sealed off at 4.

In Fig. 2 is shown another type of construction, 1 being the capillary tube, 2 and 2' being enlarged sections for terminals 3 and 3'. Two openings for filling are provided one at 4 and a second at 6.

In Fig. 3 is shown another form of construction in which the capillary tube 1 is coiled and the terminal bulbs 2 and 2' are circular in shape.

The electrical resistance of the column of electrolyte in the tubes shown in Figs. 1–3 increases markedly with a decrease in temperature. A typical resistance temperature curve is shown at 8 in Fig. 4. It will be seen that the resistance varies from about 7000 ohms at +20° C. to 350,000 ohms at −63° C.

In order to translate this resistance variation into radio signals which will be a function of temperature, the electrolytic thermometer is connected in an audio-oscillator circuit, the audio frequency of which is a function of the resistance of the electrolytic thermometer. One form of circuit arrangement is shown in Fig. 5. In this circuit the temperature tube is shown at 9 with electrodes 3 and 3' connected in the control grid 14 of a conventional form of relaxation type of oscillator 13. With this type of oscillator the audio frequency generated is a function of the resistance (among other things) in the control grid circuit. Therefore the temperature (resistance) registered by tube 9 may be calibrated in terms of the audio-frequency output of oscillator 13. Such a calibration is shown by curve 15 in Fig. 4. Here it will be seen that the frequency varies from 140 cycles per second at +20° C. to 16 cycles per second at −65° C.

The output of oscillator 13 passes through condenser 16 to audio amplifier 17, thence through condenser 18 where it modulates ultra high frequency oscillator 19 with radiating antenna 20. The A and B batteries are connected at terminals 21. For recording temperatures in radio meteorography the apparatus shown in Fig. 5 may be carried aloft by a free balloon. Resistor 10 is provided to keep the resistance in the grid circuit 14 from becoming too low and resistor 11 prevents the resistance from becoming too high, in cases of extreme variations in the temperature tube 9. By a proper choice of resistors 10 and 11 and feedback condenser 12, the frequency variation may be limited to, say, from 10 to 200 cycles per second. The audio note received on the ground preferably operates a graphical frequency recorder with scale limits between 0 and 200 cycles. The scale may be calibrated in terms of temperature so the graphical record produced reads in terms of temperature at the balloon.

Aside from eliminating mechanical parts this type of electrolytic thermometer and circuit combination offers several other advantages over the bimetallic thermometer which it has been necessary to use heretofore.

One advantage is its property of responding very rapidly to temperature changes due primarily to its low specific heat. When taken out of a chamber of −50° C. and exposed to still air at +20° C. this type of temperature indicating device changes its electrical resistance in 10 seconds from its value at −50° C. to a value corresponding to +10° C., and in 5 more seconds it will reach a value corresponding to +18° C. The time lag constant at an air speed of 600 ft. per minute is about 3 seconds. The high rate of response of the temperature device is a particular value when used in a radio meteorograph using pressure switching to give altitudes. Since readings are obtained corresponding to fixed atmospheric pressure values, the total number of readings obtained during an ascension does not depend upon the rate of balloon ascent. Hence a high rate of ascent is desirable in order to reduce the total time required for securing a complete set of meteorological observations. The response of the capillary temperature tube device is sufficient for any practical rate of ascent.

Another advantage of the capillary temperature device lies in its lack of metallic connection to the body of the meteorograph and its small mass preventing heat retention and resulting errors in true temperature measurements.

A further advantage of the electrical temperature device is that since the only connections to it are two small wires it may be located as remotely as desired from the main heat retaining and absorbing body of the radio meteorograph proper and thus indicate the true air temperature.

When using sulphuric acid as the electrolyte a polarization voltage of 1.5 volts is produced by this device when a direct current voltage is applied to its terminals. When used in the radio meteorograph circuits the applied voltage may be of the order of 90 volts, which makes the small polarization voltage of no appreciable importance except to produce a few seconds lag in coming to the true resistance when the 90 volts is first applied to the device.

The ultra high radio frequency signal carrying the audio modulation produced by the circuit arrangement in Fig. 5 is received on the ground with apparatus shown in Fig. 6, where 22 is the receiving antenna, 23 the ultra high radio frequency receiver, 24 is a filter passing the modulation frequencies only, 25 is a direct-reading audio frequency meter which may be of the General Radio Co. electronic type. The output of this frequency meter is connected to the moving element 26 of a graphical recorder 27 having motor 28 moving paper 32 under recorder pen 30 attached to arm 29 which moves with element 26. The graph 31 is a record of temperature or other phenomenon being recorded at the balloon.

In Fig. 7 at 33 is shown a typical temperature record obtained with the apparatus shown in Figs. 5 and 6. The approximate altitude was obtained from the known rate of ascent of the balloon. The increase in temperature between 56,000 and 64,000 feet was due to the fact that a leak in the balloon reduced its rate of ascent and the decreased air circulation allowed the apparatus to warm up. The sudden drop in temperature at 64,000 ft. when the balloon broke shows this to be the fact.

In Fig. 8 is shown a combination in which the electrolytic temperature tube 9 is used in conjunction with a humidity indicating element 45, photo cell 46, calibrating resistor 47, and pressure-switching commutator 37. Contact 36 moving over the segments 38 throws into the control circuit of relaxation oscillator 44 the different measuring units. Contact 36 is moved by arm 35 which is operated by atmospheric pressure element 34. Condensers 39, 40, 41 and 42 are associated with elements 9, 45, 46, and 47, respectively, and are of proper value to give an audio frequency variation of the same order for all units.

Resistors 10 and 11 serve the same function as mentioned in discussing Fig. 5. Humidity indicating device 45 may be of the electric dual coil glass type described in my copending application Serial No. 247,243 filed December 22, 1938, with a hygroscopic salt or acid coating on the glass. The resistance of such a device is a function of the water vapor in the air adjacent to it.

In Fig. 9 is shown a method of using the electrolytic temperature tube with the dual coil hygrometer and pressure switch for giving altitude. In this arrangement pressure unit 34 operates arm 35 carrying contacts 36 as in Fig. 8. The segments 38 of commutator 48 are connected so that, counting from the left the 1st, 6th, 11th, 16th and 21st are connected to resistor 10 so that when contact 36 touches these segments a high reference frequency determined by resistor 10 is transmitted. These references also establish definite altitudes. When 36 contacts the 2nd, 4th, 8th, 10th, 13th, 15th, 18th, and 20th the dual coil electric hygrometer is connected in circuit of tube 44 and the note transmitted is a function of humidity. When contact 36 touches segments 3, 5, 7, 9, 12, 14, 17 and 19 the temperature tube 9 is connected to tube 44 and the note transmitted is a function of temperature. Each contact of 36 with a segment indicates a definite altitude.

In Fig. 10 is shown another combination in which the dual coil hygrometer 45 and temperature tube 9 are used in conjunction with an auxiliary switch 55 in addition to the pressure switch 37. In this circuit combination pressure element 34 operates arm 35 moving contact 36 across commutator segments 38. Alternate segments 38 are connected through reference resistor 50 to ground and intermediate segments directly to ground so that a reference frequency is produced slightly lower than that produced when resistor 50 is in circuit—this is for the purpose of identification of commutator contacts. When contact 36 is on an insulating segment, switch 55 places either the temperature tube 9 or humidity unit 45 in the circuit of the relaxation oscillator 44. When contact 54 operated by arm 51 touches contact 53 the humidity element 45 is in circuit and when contact 54 touches contact 52 the temperature tube is in circuit. When contact 54 is between 53 and 52 resistor 11 functions to send a low reference frequency. Any suitable means may be employed for operating the switch 55. For example, a small spring—electric—or windmotor may drive arm 51 by means of cams or gearing, or a suitable resistance-capacity time-delay circuit may operate arm 51 as a time-lag relay.

In Fig. 11 is shown a combination of the temperature tube with a multi-segment commutator for switching into circuit a multiplicity of measuring devices in conjunction with the temperature tube.

In this circuit the relaxation oscillator 57 is equivalent to the oscillator shown in Fig. 5, and has the shunt resistor 11 and series resistor 10. The commutator 68 has a shaft 66 driven by some spring or electric motor or air-operated device. Shaft 66 carries contact arm 67 moving over segments 60, 61, 62, 63, 64 and 65. Arm 67 is connected through resistor 58 to resistor 10 and also to the 2nd, 3rd, 4th, 5th, 7th, 8th, 9th and 10th segments of commutator 56. The 1st, 6th and 11th segments are connected to the common connection between resistors 58 and 10. Low reference resistor 47 is connected to commutator segment 65, temperature tube 9 is connected to segments 64 and 61. Segment 63 is connected to photo cell 46, segment 62 is connected to humidity device 45, and segment 60 to humidity device 59, which may cover a different part of the humidity scale than 45 or it may function at lower temperatures than 45.

When contact 36 is on an insulating segment of commutator 56, the revolution of arm 67 of commutator 68 connects the various measuring devices 47, 46, 9, 45 and 59 into the relaxation oscillator 57 through resistors 10 and 11. When contact 36 touches the 2nd, 3rd, 4th, 5th, 7th, 8th, 9th and 10th segments of commutator 56 the commutator 68 is shorted out of circuit and resistors 58 and 10 give a reference frequency. When contact 36 touches the 1st, 6th, and 11th segment resistor 10 only is in circuit and a reference frequency higher than that produced by contact on the other segments is transmitted.

In Fig. 12 is shown a type of record as produced by the arrangement shown in Fig. 11. Here 69 represents the frequency produced by tube 9 (Fig. 11) when arm 67 touches contact 64 (temperature) 70 the frequency produced when 67 touches segment 63 (light brightness), 71 the frequency produced when arm 67 touches segment 62 (humidity for high temperatures), 72 the frequency produced when 67 touches 61 (second temperature reading), 73 the frequency produced when 67 touches 60 (humidity for low temperatures), 74 the frequency produced when 67 touches 65 (references 10, 58, 47), 75 the frequency produced when 67 touches 64 (third temperature reading), 76 the frequency produced when 67 touches 63 (second light reading), 77 the frequency produced when 67 touches 62 (second high-temperature humidity), 78 the frequency produced when 67 touches 61 (4th temperature reading), 79 the frequency produced when contact 36 of pressure commutator 56 shorts the commutator 68 and touches the top segment of commutator 56. 80 the frequency produced when 36 touches the second segment of 56 from top, etc.

In Fig. 13 is shown a commutator 81 similar to 68 in Fig. 11 except that the extra temperature tube segment 64 is used for ionic altimeter 83 in series with battery 82. Ionic altimeter 83 may be of any suitable type. That shown for purposes of illustration may be calibrated in terms of atmospheric pressure and produces a frequency proportional to the density of the air between its plates 84 and 85. 86 is a coating of radio-active material for ionizing the air.

There has been described above what is now considered to be the best embodiment of the invention, but it is to be understood that the invention is not limited to the details of the embodiment disclosed, but is defined by the reasonable scope of the appended claims.

I claim:

1. An electrolytic thermometer comprising a thin-walled capillary tube, chambers at the respective ends of said tube communicating with the capillary passage therethrough, an electrolyte filling said tube and conductors in contact with the electrolyte in said respective chambers.

2. A resistor inherently variable in response to changes of temperature comprising a thin-walled capillary tube and an electrolyte therein the resistance of which varies inherently with temperature, the thinness of said tube providing for rapid heat transference between said electrolyte and the surrounding medium, and spaced conductors in contact with said electrolyte.

3. An electrolytic audio frequency indicating thermometer, comprising a capillary heat conductive tube containing an electrolyte the resistance of which varies inherently with the temperature, an audio oscillator variable in frequency in response to the value of resistance in its control circuit and means connecting the electrolyte column in the capillary tube in said control circuit.

4. A device of the class described comprising contact chambers connected by an electrically insulating, heat conductive capillary tube about ten centimeters long, of a capillary diameter of about half a millimeter, and with a wall thickness of about three-fourths of a millimeter, an electrolyte in said contact chambers and tube inherently varying in resistance with change in temperature, and electrodes connected with said electrolyte in said contact chambers.

5. In a radiometeorograph, means for generating a carrier signal, modulator means for applying thereto a resistance varied modulation signal, a capillary electrolytic column the resistance of which is inherently variable with temperature, and means for connecting said capillary column in controlling relation to said modulator.

6. In a radiometeorograph, means for indicating atmospheric temperature at various heights in the atmosphere, comprising a resistance controlled radio transmitter, a capillary electrolytic column the resistance of which is inherently rapidly variable with temperature, means connecting said capillary column in controlling relation to said transmitter, and means associated with said transmitter for imparting to the transmitted signal a characteristic indicative of the height from which particular temperature indicating signals are transmitted.

FRANCIS W. DUNMORE.